(12) United States Patent
Cope et al.

(10) Patent No.: US 8,712,407 B1
(45) Date of Patent: Apr. 29, 2014

(54) MULTIPLE SECURE ELEMENTS IN MOBILE ELECTRONIC DEVICE WITH NEAR FIELD COMMUNICATION CAPABILITY

(75) Inventors: Warren B. Cope, Olathe, KS (US); Lyle W. Paczkowski, Mission Hills, KS (US); William Michael Parsel, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/440,980

(22) Filed: Apr. 5, 2012

(51) Int. Cl.
*H04W 4/00* (2009.01)

(52) U.S. Cl.
USPC ....... 455/426.1; 455/410; 455/411; 455/41.1; 455/41.2

(58) Field of Classification Search
USPC ............ 455/410, 411, 426.1, 41.1, 41.2, 557, 455/558
See application file for complete search history.

(56) References Cited

U.S. PATENT DOCUMENTS

| | | | |
|---|---|---|---|
| 5,303,378 | A | 4/1994 | Cohen |
| 6,668,322 | B1 | 12/2003 | Wood et al. |
| 6,823,454 | B1 | 11/2004 | Hind et al. |
| 6,824,064 | B2 | 11/2004 | Guthery et al. |
| 6,895,234 | B1 | 5/2005 | Laursen et al. |
| 7,650,645 | B1 | 1/2010 | Langendorf et al. |
| 7,873,837 | B1 | 1/2011 | Lee et al. |
| 8,238,823 | B2 | 8/2012 | Maugars et al. |
| 8,494,576 | B1 | 7/2013 | Bye et al. |
| 8,504,097 | B1 | 8/2013 | Cope et al. |
| 8,649,770 | B1 | 2/2014 | Cope et al. |
| 2002/0098389 | A1 | 7/2002 | Gaines |
| 2002/0174344 | A1 | 11/2002 | Ting |
| 2002/0184325 | A1 | 12/2002 | Killcommons et al. |
| 2002/0194496 | A1 | 12/2002 | Griffin et al. |
| 2003/0126225 | A1 | 7/2003 | Camble et al. |
| 2004/0243810 | A1 | 12/2004 | Ringborg et al. |
| 2005/0015601 | A1 | 1/2005 | Tabi |
| 2005/0138433 | A1 | 6/2005 | Linetsky |
| 2005/0235166 | A1 | 10/2005 | England et al. |

(Continued)

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |

OTHER PUBLICATIONS

Cope, Warren B., et al., "Electronic Purchase Transaction Trust Infrastructure", filed May 29, 2012, U.S. Appl. No. 13/482,731.

(Continued)

*Primary Examiner* — Kashif Siddiqui
*Assistant Examiner* — Mong-Thuy Tran (57) ABSTRACT

A method of managing data communication network inventory is provided. The method comprises analyzing a plurality of separate data stores, the data stores comprising information about trouble tickets, change requests, and scheduled maintenance, where the analysis is conducted with reference to network inventory items. An integrated data store structured according to network inventory items is built, comprising trouble ticket information, change request information, and scheduled maintenance associated with the network inventory items, where the network inventory items comprise one or more port interfaces. A selection of a network inventory item is received. Filtered information is retrieved from the integrated data store summarizing the trouble ticket information, the change request information, and the scheduled maintenance related to the selected network inventory item. The filtered information is transmitted.

16 Claims, 6 Drawing Sheets

(56) References Cited

U.S. PATENT DOCUMENTS

| | | |
|---|---|---|
| 2006/0036851 A1 | 2/2006 | DeTreville |
| 2006/0212853 A1* | 9/2006 | Sutardja ............... 717/131 |
| 2006/0224901 A1 | 10/2006 | Lowe |
| 2006/0261949 A1 | 11/2006 | Kim et al. |
| 2006/0277433 A1 | 12/2006 | Largman et al. |
| 2007/0061535 A1 | 3/2007 | Xu et al. |
| 2007/0079120 A1 | 4/2007 | Bade et al. |
| 2007/0094273 A1 | 4/2007 | Fritsch et al. |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0092213 A1 | 4/2008 | Wei et al. |
| 2008/0097793 A1 | 4/2008 | Dicks et al. |
| 2008/0121687 A1* | 5/2008 | Buhot ............... 235/375 |
| 2008/0162361 A1* | 7/2008 | Sklovsky et al. ............. 705/65 |
| 2008/0176538 A1 | 7/2008 | Terrill et al. |
| 2008/0188178 A1 | 8/2008 | Maugars et al. |
| 2008/0201212 A1* | 8/2008 | Hammad et al. ............... 705/13 |
| 2008/0212503 A1 | 9/2008 | Lipford et al. |
| 2009/0055278 A1 | 2/2009 | Nemani |
| 2009/0070272 A1* | 3/2009 | Jain ............... 705/75 |
| 2009/0113425 A1 | 4/2009 | Ports et al. |
| 2009/0193491 A1 | 7/2009 | Rao |
| 2009/0281947 A1* | 11/2009 | Erel ............... 705/44 |
| 2009/0300599 A1 | 12/2009 | Piotrowski |
| 2009/0320028 A1* | 12/2009 | Gellerich et al. ............. 718/102 |
| 2010/0031325 A1 | 2/2010 | Maigne et al. |
| 2010/0052844 A1 | 3/2010 | Wesby |
| 2010/0128598 A1 | 5/2010 | Gandhewar et al. |
| 2010/0142517 A1 | 6/2010 | Montemurro et al. |
| 2010/0153721 A1 | 6/2010 | Mellqvist |
| 2010/0162028 A1 | 6/2010 | Frank et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0274726 A1* | 10/2010 | Florek et al. ............... 705/72 |
| 2010/0281139 A1 | 11/2010 | Deprun |
| 2010/0318802 A1 | 12/2010 | Balakrishnan |
| 2011/0014948 A1* | 1/2011 | Yeh ............... 455/558 |
| 2011/0021175 A1* | 1/2011 | Florek et al. ............... 455/410 |
| 2011/0035604 A1 | 2/2011 | Habraken |
| 2011/0078081 A1* | 3/2011 | Pirzadeh et al. ............. 705/44 |
| 2011/0082711 A1 | 4/2011 | Poeze et al. |
| 2011/0112968 A1* | 5/2011 | Florek et al. ............... 705/50 |
| 2011/0202916 A1 | 8/2011 | VoBa et al. |
| 2011/0212707 A1* | 9/2011 | Mahalal ............... 455/411 |
| 2011/0226853 A1* | 9/2011 | Soh et al. ............... 235/380 |
| 2011/0237190 A1* | 9/2011 | Jolivet ............... 455/41.2 |
| 2011/0238992 A1 | 9/2011 | Jancula et al. |
| 2011/0281558 A1* | 11/2011 | Winter ............... 455/411 |
| 2011/0294418 A1* | 12/2011 | Chen ............... 455/41.1 |
| 2012/0011572 A1* | 1/2012 | Chew et al. ............... 726/4 |
| 2012/0021683 A1* | 1/2012 | Ma et al. ............... 455/41.1 |
| 2012/0028575 A1* | 2/2012 | Chen et al. ............... 455/41.1 |
| 2012/0029997 A1 | 2/2012 | Khan et al. |
| 2012/0036347 A1 | 2/2012 | Swanson et al. |
| 2012/0052801 A1* | 3/2012 | Kulkarni ............... 455/41.1 |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0143703 A1* | 6/2012 | Wall et al. ............... 705/16 |
| 2012/0149327 A1* | 6/2012 | Raboisson et al. ............. 455/410 |
| 2012/0158467 A1* | 6/2012 | Hammad et al. ............... 705/13 |
| 2012/0159163 A1* | 6/2012 | von Behren et al. ......... 713/168 |
| 2012/0159612 A1* | 6/2012 | Reisgies ............... 726/18 |
| 2012/0178365 A1* | 7/2012 | Katz et al. ............... 455/41.1 |
| 2012/0178366 A1* | 7/2012 | Levy et al. ............... 455/41.1 |
| 2012/0190332 A1* | 7/2012 | Charles ............... 455/410 |
| 2012/0198519 A1 | 8/2012 | Parla et al. |
| 2012/0202423 A1* | 8/2012 | Tiedemann et al. ......... 455/41.1 |
| 2012/0226582 A1 | 9/2012 | Hammad |
| 2012/0226772 A1 | 9/2012 | Grube et al. |
| 2012/0238206 A1* | 9/2012 | Singh et al. ............... 455/41.1 |
| 2012/0252480 A1* | 10/2012 | Krutt et al. ............... 455/456.1 |
| 2012/0258690 A1 | 10/2012 | Chen et al. |
| 2012/0266076 A1 | 10/2012 | Lockhart et al. |
| 2012/0266220 A1* | 10/2012 | Brudnicki et al. ............. 726/6 |
| 2012/0295588 A1* | 11/2012 | Chen et al. ............... 455/411 |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0324293 A1 | 12/2012 | Grube et al. |
| 2013/0014259 A1 | 1/2013 | Gribble et al. |
| 2013/0047197 A1 | 2/2013 | Saroiu et al. |
| 2013/0054474 A1* | 2/2013 | Yeager ............... 705/71 |
| 2013/0062417 A1* | 3/2013 | Lee et al. ............... 235/492 |
| 2013/0086684 A1 | 4/2013 | Mohler |
| 2013/0097302 A9 | 4/2013 | Khedouri et al. |
| 2013/0109307 A1* | 5/2013 | Reisgies et al. ............. 455/41.1 |
| 2013/0117186 A1* | 5/2013 | Weinstein et al. ............. 705/67 |
| 2013/0138521 A1 | 5/2013 | Want et al. |
| 2013/0138959 A1* | 5/2013 | Pelly et al. ............... 713/168 |
| 2013/0140360 A1* | 6/2013 | Graylin ............... 235/380 |
| 2013/0143489 A1* | 6/2013 | Morris et al. ............... 455/41.1 |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0305333 A1 | 11/2013 | Katzer et al. |
| 2013/0345530 A1 | 12/2013 | McRoberts et al. |
| 2014/0033316 A1 | 1/2014 | Paczkowski et al. |
| 2014/0047548 A1 | 2/2014 | Bye et al. |

OTHER PUBLICATIONS

Cope, Warren B., et al., "Alternative hardware and Software Configuration for Near Field Communication", filed May 4, 2012, U.S. Appl. No. 13/463,797.

FAIPP Pre-Interview Communication dated Oct. 24, 2012, U.S. Appl. No. 13/463,801, filed May 3, 2012.

Bye, Stephen James, et al., "Near Field Communication Authentication and Validation to Access Corporate Data", filed May 3, 2012, U.S. Appl. No. 13/463,801.

FAIPP Pre-Interview Communication dated Oct. 24, 2012, U.S. Appl. No. 13/463,797, filed May 3, 2012.

Notice of Allowance dated Mar. 1, 2013, U.S. Appl. No. 13/463,797, filed May 3, 2012.

Notice of Allowance dated Mar. 14, 2013, U.S. Appl. No. 13/463,801, filed May 3, 2012.

FAIPP Pre-Interview Communication dated Jul. 25, 2013, U.S. Appl. No. 13/470,203, filed May 11, 2012.

FAIPP Pre-Interview Communication dated Jun. 6, 2013, U.S. Appl. No. 13/571,348, filed Aug. 10, 2012.

FAIPP Pre-Interview Communication dated Jun. 5, 2013, U.S. Appl. No. 13/556,200, filed Jul. 24, 2012.

First Action Interview Office Action dated Aug. 19, 2013, U.S. Appl. No. 13/556,200, filed Jul. 24, 2012.

First Action Interview Pre-Interview Communication dated Dec. 27, 2011, U.S. Appl. No. 12/486,873, filed Jun. 18, 2009.

First Action Interview Office Action dated Feb. 13, 2012, U.S. Appl. No. 12/486,873, filed Jun. 18, 2009.

Office Action dated Jul. 5, 2012, U.S. Appl. No. 12/486,873, filed Jun. 18, 2009.

Final Office Action dated Feb. 1, 2013, U.S. Appl. No. 12/486,873, filed Jun. 18, 2009.

Katzer, Robin D., et al., "Web Server Bypass of Backend Process on Near Field Communications and Secure Elements Chips", filed May 11, 2012, U.S. Appl. No. 13/470,203.

(56) References Cited

OTHER PUBLICATIONS

Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed May 10, 2013.
Giesecke & Devrient, "The OTA Platform in the World of LTE", Jan. 2011, http://www.gi-de.com/gd_media/media/en/documents/brochures/mobile_security_2/cst_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed Jun. 25, 2013.
Foreign Communication from a Related Counterpart—International Search Report and Written Opinion, dated Feb. 4, 2014, PCT/US13/51750, filed Jul. 24, 2013.

\* cited by examiner

MULTIPLE SECURE ELEMENTS IN MOBILE ELECTRONIC DEVICE WITH NEAR FIELD COMMUNICATION CAPABILITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near field communication (NFC) refers to short-range wireless radio communication between two devices, typically occurring over distances of no more than a few centimeters. NFC radio communication may be used for financial transactions such as completing a payment transaction from a mobile phone encapsulating an electronic credit card and/or debit card to a point-of-sale (POS) terminal. NFC radio communication may be used to provide personal identification and/or to electronically access physical spaces, for example to provide a student identification, an employee identification, a medical identification; to activate a badge reader to unlock an entry door; to access a hotel room; to access a rental car. NFC radio communication may be used for communicating content such as reading explanatory information from an NFC tag coupled to a placard in a museum or in a retail display.

A secure element (SE) is a combination of hardware, software, interfaces, and protocols that enable the secure storage and usage of credentials for payments, authentication and other services. Secure elements assure security in these service processes. Secure elements may reside on an embedded hardware semiconductor chip in a mobile device, in a removable memory card that holds an embedded chip which can be used as a secure element, and in a universal integrated circuit card (UICC), which is typically used to authenticate a mobile device to a mobile network.

SUMMARY

In an embodiment, a system on a mobile phone for selecting between a plurality of secure elements concurrently present on the mobile phone is disclosed, where the selected secure element is used for wireless payment. The system comprises a first virtual processor, a second virtual processor that implements a trusted security zone, a near field communication transceiver, and a plurality of secure elements. The first virtual processor comprises an application for selecting a secure element from the plurality of secure elements. The second virtual processor comprises a switching application stored in the trusted security zone, where the switching application couples the near field communication transceiver to a single secure element based on the selection received from the application stored in the first virtual processor.

In an embodiment, a method of secure element selection for wireless payment and access control is disclosed. The method comprises selecting in a first application on a mobile device a secure element from a plurality of secure elements concurrently present on the mobile device. The selection of the secure element from the first application is sent to a second application, where the second application is stored in a trusted security zone on the mobile device. A near field communication transceiver in the mobile device is coupled to the selected secure element, where switching logic in the second application executes to perform the coupling. A wireless link between the near field communication transceiver in the mobile device and an external near field communication device is established, where the wireless link enables communication between the selected secure element and the external near field communication device.

In an embodiment, a method of secure element selection for wireless payment and access control is disclosed. The method comprises inserting a removable card into a slot in a mobile device, where the card comprises a secure element. The secure element on the removable card inserted in the mobile device is automatically selected for use by applications on the mobile device requiring a secure element, where the selection is performed by an application stored in a trusted security zone on the mobile device. A near field communication transceiver in the mobile device is coupled to the selected secure element on the removable card, where switching logic in the application stored in the trusted security zone on the mobile device executes to perform the coupling. A wireless link between the near field communication transceiver in the mobile device and an external near field communication device is established, where the wireless link enables communication between the selected secure element on the removable card and the external near field communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Near field communication (NFC) allows for transactions, data exchange, and wireless connections between two devices in proximity to each other. Technology based on near field communication specifications may be used in a mobile phone or similar mobile device to enable users to make mobile payments with the mobile phone. A secure element (SE) component in the mobile phone is designed to only allow trusted programs on the secure element itself access to the data and payment credentials stored therein. Due to the linked nature of the secure element and the near field communication transceiver in the mobile phone, only one secure element is typically supported in the mobile phone.

The present disclosure teaches a system and method for secure element selection for wireless payment and access control. The system provides the ability to reconfigure the secure element selection while still using standard near field communication and secure element components. This is accomplished through a switching application located in a trusted security zone on a mobile device comprising a plurality of secure elements. The switching application supports selection rules such as location based selection, user selection, and selection control by an application such as an electronic wallet. The selection rules may result in the switching application automatically coupling a selected secure element to a near field communication transceiver in the mobile device, or alternatively to receive a selection from a user or application on the device and coupling the received secure element selection to the near field communication transceiver.

In an embodiment, a trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming mainstream features in mobile device chipsets. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment.

A complete Trusted Execution Environment (TEE) may be implemented through the use of the trusted security zone hardware and software architecture. The Trusted Execution Environment is an execution environment that is parallel to the execution environment of the main mobile device operating system. Through standardization of application programming interfaces (APIs), the Trusted Execution Environment becomes a place to which scalable deployment of secure services can be targeted. A device which has a chipset that has a Trusted Execution Environment on it may exist in a trusted services environment, where devices in the trusted services environment are trusted and protected against attacks. The Trusted Execution Environment can be implemented on mobile phones and tablets as well as extending to other trusted devices such as sensors, medical devices, point-of-sale terminals, industrial automation, handheld terminals, automotive, etc.

The trusted security zone may be implemented by partitioning all of the hardware and software resources of the mobile device into two partitions: a secure partition and a normal partition. In some contexts, the secure partition may be referred to as a secure world or a secure execution world and the normal partition may be referred to as a non-secure world or a non-secure execution world. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the Trusted Execution environment, the main mobile operating system in the normal partition is suspended, and applications in the normal partition are prevented from accessing the secure peripherals and data. This prevents corrupted applications or malware applications from breaking the trust of the device.

The trusted security zone may be implemented by partitioning the hardware and software resources to exist in a secure subsystem which is not accessible to components outside the secure subsystem. The trusted security zone is built into the processor architecture through hardware logic present in the trusted security zone which enables a perimeter boundary between the secure partition and the normal partition. Software architecture to support the secure partition may be provided through a dedicated secure kernel running trusted applications. Trusted applications are independent secure applications which can be accessed by normal applications through an application programming interface in the Trusted Execution Environment on a chipset that utilizes the trusted security zone.

In an embodiment, the normal partition applications may run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors may context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the mobile device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Secure elements are a combination of hardware and software that enable secure storage and usage of credentials and data for electronic payments, authentication and other services. Secure elements may be dedicated, embedded hardware in the mobile device. Alternatively, secure elements may be removable cards, such as memory cards or subscriber identity module (SIM) cards, which may be inserted into slots in the mobile device. Both embedded and removable secure elements provide the same secure storage for data and programs for implementing mobile financial services. Supported services may include mobile banking and payment services, electronic ticketing, electronic identification and other wireless mobile transactions needing secure interfaces. The switching application in the trusted security zone provides the flexibility for the mobile device to support multiple secure elements while maintaining the security of standard near field communication and secure element components.

Figure 1:
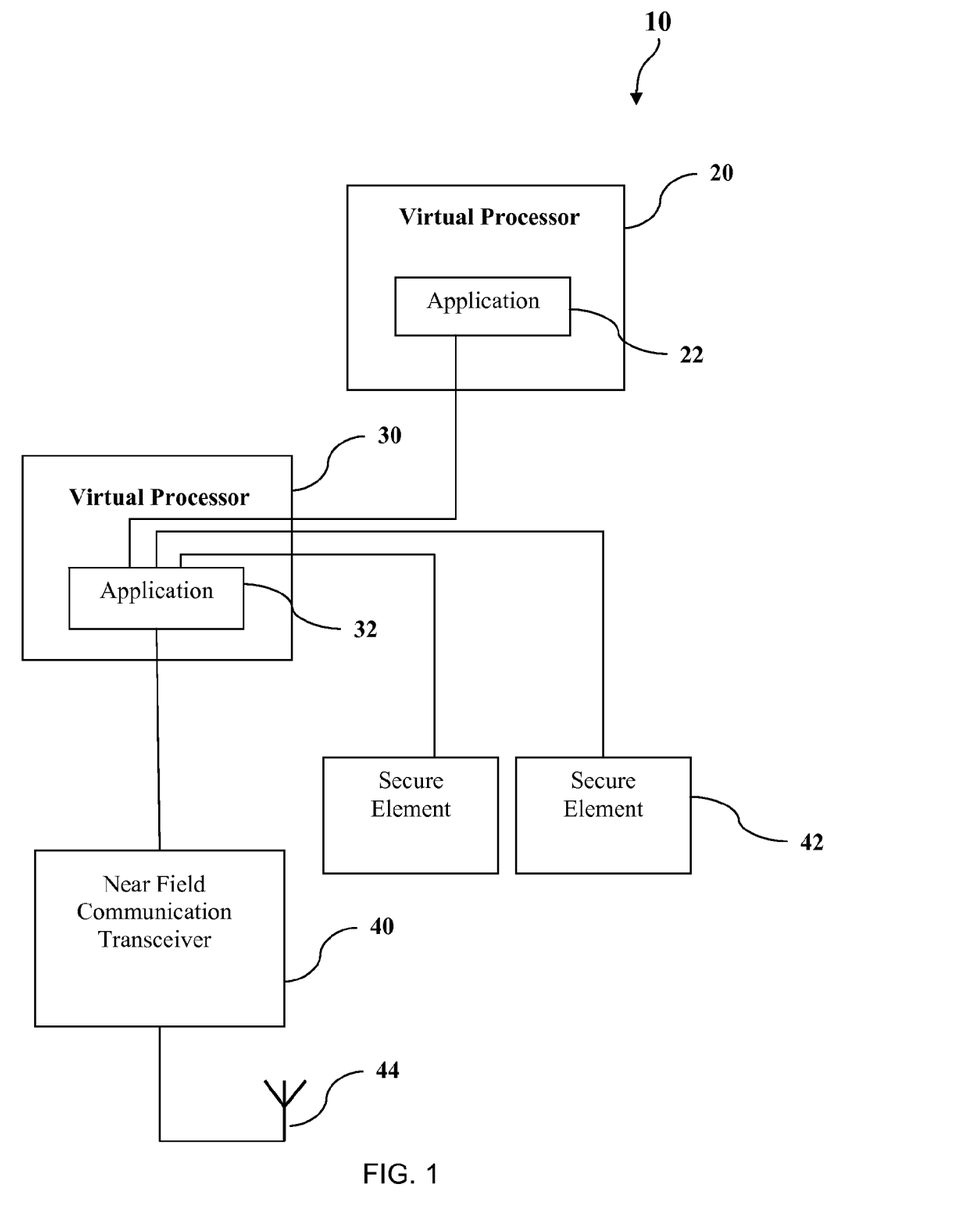
FIG. 1 is a block diagram of a system for selecting between a plurality of secure elements on a mobile phone according to an embodiment of the disclosure.

Turning now to FIG. 1, a system 10 on a mobile phone for selecting between a plurality of secure elements concurrently present on the mobile phone is described, where the selected secure element is used for wireless payment and for other near field communication transactions. The system 10 comprises a first virtual processor 20, a second virtual processor 30, a near field communication transceiver 40, a plurality of secure elements 42, and a near field communication antenna 44. The first virtual processor 20 comprises an application 22 used to make a selection of a secure element 42 to be used for wireless payment. The second virtual processor 30 comprises an application 32 stored in a trusted security zone, where the trusted security zone is implemented by partitioning the hardware and software resources to exist in a secure subsystem which are not accessible to components outside the secure subsystem. In an embodiment, the system 10 can alternatively be implemented on other mobile devices such as a personal digital assistant, a media player, or other mobile devices.

The near field communication transceiver 40 allows for secure transactions, data exchange, and wireless connections with other near field communication devices, enabling communication with devices in close proximity. The plurality of secure elements 42 comprise data and programs in a specialized semiconductor chip that is designed to thwart attempts to reverse engineer the secure element or to physically slice and examine the secure element under a microscope. The secure elements 42 may store credentials and data used for mobile financial services, identification documents, and electronic ticketing accessible only to trusted programs stored on the secure element 42 itself.

In an embodiment, the switching application 32 couples the near field communication transceiver 40 to a single secure element 42 based on a selection received from the application 22 stored in the first virtual processor 20. For example, the first application 22 may be an electronic wallet application selecting a secure element 42 containing credentials and account information for a credit card to be used for a mobile payment. The electronic wallet application 22 sends the selection of the secure element 42 to the switching application 32 in the trusted security zone of the second virtual processor 30. The switching application 32 receives the selection and couples the selected secure element 42 to the near field communication transceiver 40. The mobile phone is now ready to establish a near field communication link through the near field antenna 44 with an external device such as a contactless point of sale terminal and make a secure mobile payment using the credit card credentials from the selected secure element 42. In an embodiment the near field communication antenna 44 is built in to the near field communication transceiver 40.

In an embodiment, the switching application 32 controls a hardware switch to couple the near field communication transceiver 40 to the selected secure element 42. The hardware switch may be electronic or electromechanical. In an embodiment, the secure flow of information between the secure element 42, the near field communication transceiver 40, and the external near field communication device does not pass through the switching application 32, maintaining the security chain for the secure mobile transaction.

In an embodiment, the trusted security zone utilizes security extensions implemented in Advanced Reduced Instruction Set Computer Machine (ARM) architecture. ARM processors run rich operating systems and applications while providing a low power design suitable for high performance but power efficient mobile phones. The trusted security zone technology is tightly integrated with the ARM processor in a system wide approach to security suitable for applications such as secure mobile payments. The trusted security zone is built into the processor architecture and may be provided through a dedicated secure kernel running independent secure applications which can be accessed by normal applications through the trusted security zone application programming interface (API).

In an embodiment, the plurality of secure elements 42 comprises memory cards with a secure element component, subscriber identity module (SIM) cards with a secure element component, and embedded secure element chips. Memory cards may be used in a mobile phone to provide storage space for applications and data, extending the memory built into the mobile phone. Memory cards with an embedded secure element added provide a flexible means to support secure elements from a plurality of sources, such as financial institutions or large retail chains. Removable memory cards with an embedded secure element also allow switching between secure element providers as desired, decoupling the secure element and its embedded applications from the mobile phone. In some embodiments the memory card may include an NFC transceiver in addition to the secure element, allowing secure mobile payment support for mobile phones which may not have originally been built with the functionality.

Subscriber identity module cards have been used typically to authenticate a user in a mobile network. Similar to the memory card model, an embedded secure element adds secure element support to subscriber identity module cards. An embedded chip is a security component embedded in a mobile phone at the time of manufacturing which is capable of handling and storing information in a secure manner. Embedded secure elements, when combined with a near field communication transceiver, allow secure mobile transactions with the mobile phone hardware without the need for additional cards.

In an embodiment, the application 22 stored in the first virtual processor 20 is one of an electronic wallet application, a ticketing application, or a secure identification application. An electronic wallet application allows users to make electronic commerce transactions quickly and securely utilizing stored credentials and financial information on the mobile phone. A ticketing application allows users to order, pay for and validate tickets using their mobile phone. Examples include mass transit tickets such as bus, rail and subway tickets, movie tickets, and event tickets. A secure identification application may use the mobile phone in place of employee identification badges or a student identification card, or as a key card for a hotel room.

In an embodiment, the near field communication transceiver 40 is coupled to the selected secure element 42 via the Single Wire Protocol (SWP). The single wire protocol is a specification by the European Telecommunications Standards Institute (ETSI) for a single wire connection between the subscriber identity module (SIM) card and the near field communication transceiver in a mobile phone. The single wire protocol interface is a bit oriented point-to-point communication protocol based on the transmission of digital information in full duplex mode.

In an embodiment, the first virtual processor 20 and the second virtual processor 30 execute in a time-sliced fashion. The security of the system 10 is achieved by partitioning the hardware and software resources of the mobile phone so they exist in one of two worlds, a normal world running on the first virtual processor 20 and the secure world running on the second virtual processor 30. Both virtual processors 20, 30 may run on a single physical processor to safely and efficiently execute code in a time-sliced fashion, removing the need for a dedicated physical security processor. Time-sliced execution comprises switching contexts between the two virtual processors 20, 30 to share processor resources based on tightly controlled mechanisms such as secure software instructions or hardware exceptions. The state of the currently running virtual processor is saved and the state of the virtual processor being switched to is restored and processing is restarted in the restored virtual processor.

Figure 2:
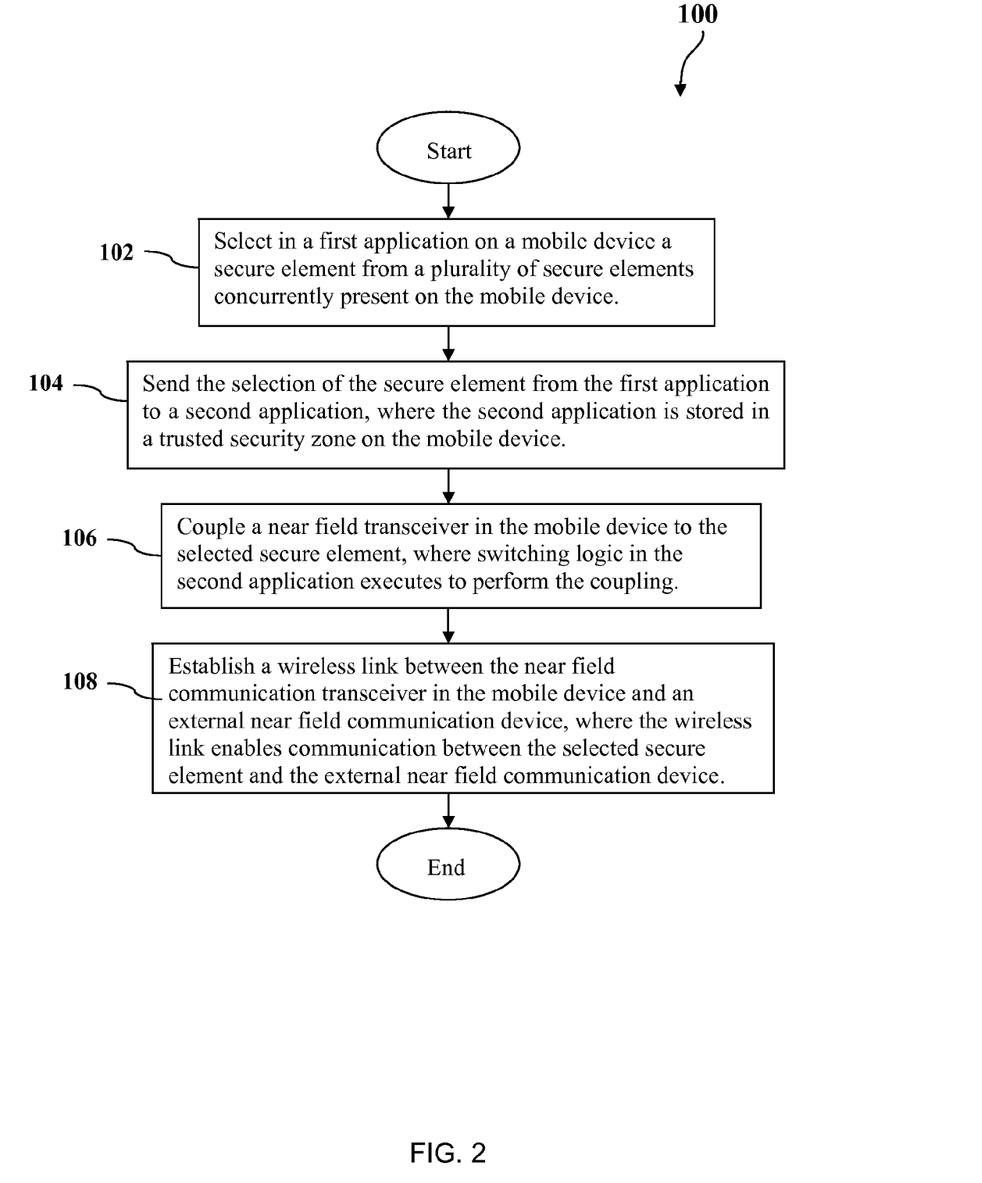
FIG. 2 is a flow chart of a method of secure element selection for wireless payment and access control according to an embodiment of the disclosure.

Turning now to FIG. 2, a method 100 of secure element selection for wireless payment and access control is described. At block 102, a secure element is selected in a first application on a mobile device from a plurality of secure elements concurrently present on the mobile device. The first application may utilize the secure element to perform its functionality, such as a banking application accessing the secure element to display balance information to the mobile phone user. At block 104, the selection of the secure element from the first application is sent to a second application, where the second application is stored in a trusted security zone on the mobile device. The second application in the trusted security zone may interface directly with the selected secure element, whereas the first application residing in the normal application space interfaces with the secure element through other trusted applications.

At block 106, a near field communication transceiver in the mobile device is coupled to the selected secure element, where switching logic in the second application executes to perform the coupling. The second application comprises switching logic capable of coupling the selected secure element with the near field communication transceiver in the mobile device. Because the second application resides in the trusted security zone, it can support interaction with the secure elements without impeding the security chain required by mobile financial services standards. At block 108, a wireless link is established between the near field communication transceiver in the mobile device and an external near field communication device, where the wireless link enables communication between the selected secure element and the external near field communication device. The coupling of the selected secure element and the near field communication transceiver in the mobile device allows for the communication path to the external near field communication device. In an embodiment, the coupling comprises changing the state of a hardware switch to couple the near field communication transceiver to the selected secure element. To accommodate the timing specifications for initiating a near field communication session, this coupling is performed prior to establishing the wireless link with the external near field communications device. Once the wireless link is established, communication between the selected secure element and the external near field communication device is enabled.

In an embodiment, the first application on the mobile device is an electronic wallet application and the selected secure element contains credentials which may be used for payments, authentication, and other mobile financial services. An electronic wallet application allows users to make electronic commerce transactions quickly and securely utilizing stored credentials and financial information on the mobile phone. The credentials enabling the mobile financial services are stored in the selected secure element and the electronic wallet application has appropriate access rights to initiate the selection through the second application in the trusted security zone.

In an embodiment, the switching logic in the second application comprises selection rules used to determine the secure element to be coupled to the near field communication transceiver. Selection rules may allow the second application to automatically select a secure element based on predefined conditions being present on the mobile phone. Selection rules may also provide a decision tree for the second application to follow when making a secure element selection. In an embodiment, the selection rules comprise user selection, electronic wallet selection, and location based selection rules. Location based selection may recognize when you arrive at a mass transit station and select the secure element containing your mass transit ticket credentials. An electronic wallet may select the secure element based on the last account accessed in the electronic wallet. Alternatively, the user may know they want to utilize an account stored on the secure element on the subscriber identity module and may select that secure element directly from a user interface.

In an embodiment, the trusted security zone runs a separate operating system that is not accessible to the mobile device users. The security of the system is achieved at least in part by partitioning the hardware and software resources of the mobile phone so they exist in one of two worlds, the secure world for the security subsystem and the normal world for everything else. Hardware logic ensures that no secure world resources can be accessed by the normal world components.

A dedicated secure world operating system runs in a virtual processor separate from the normal world operating system that likewise executes in its own virtual processor. In an embodiment, the applications stored in the trusted security zone are installed by the mobile device vendor or manufacturer. For security purposes, the trusted security zone is not open to users for installing applications. Users may install applications on the mobile device which may execute in the normal world operating system described above. The trusted security zone runs a separate operating system for the secure world that is installed by the mobile device manufacturer or vendor, and users are not able to install new applications in or alter the contents of the trusted security zone.

In an embodiment, the near field communication transceiver is coupled to the selected secure element via the Single Wire Protocol (SWP). The Single Wire Protocol provides a well-defined, secure interface between the near field communication transceiver and the selected secure element. In an embodiment, the switching logic in the second application is transparent to the near field communication and secure element components. Due to the timing constraints in the specification for near field communication, for example, possibly with a response expected within 20 ms, the switching logic may not interfere with the communication between the near field communication transceiver and the selected secure element. To support this, execution of the switching logic is separate from the initiation of the near field communication connection. The second application executes the switching logic and couples the near field communication transceiver and the selected secure element prior to the initiation of the near field communication connection. In this manner, when the near field communication connection is established, the switching has already taken place and is transparent to the components involved. In an embodiment, the switching logic in the second application does not impede the near field communication security chain. The second application resides in the trusted security zone and executes in advance of initiating a near field communication connection, allowing the switching logic to complete the coupling without impeding the security requirements of the near field communication specification.

Figure 3:
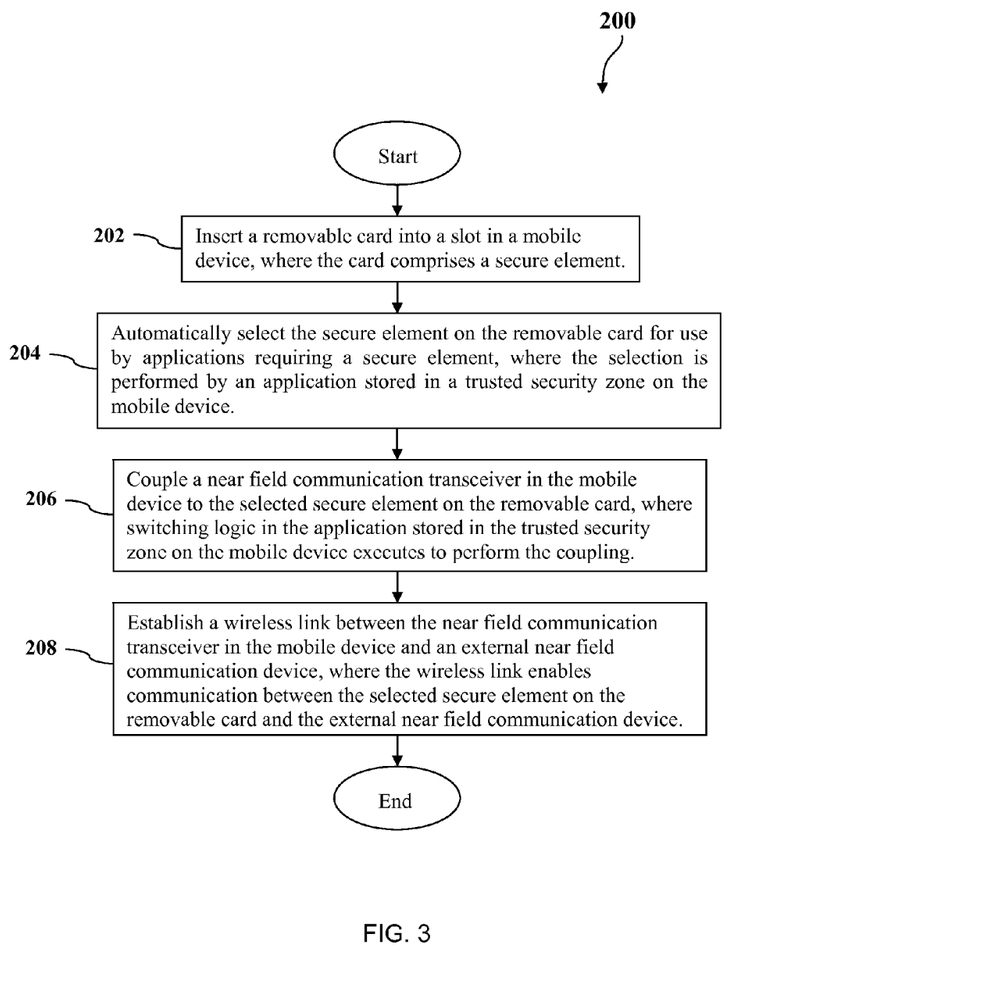
FIG. 3 is a flow chart of a method of secure element selection for wireless payment and access control according to an embodiment of the disclosure.

Turning now to FIG. 3, a method 200 of secure element selection for wireless payment and access control is described. At block 202, a removable card is inserted into a slot in a mobile device, where the card comprises a secure element. Mobile devices commonly support slots for memory cards and subscriber identity module cards. A secure element may be embedded in a removable card using a standard supported slot to add secure functionality to the mobile device. At block 204, the secure element on the removable card is automatically selected for use by applications that employ a secure element, where the selection is performed by an application stored in a trusted security zone on the mobile device. The application in the trusted security zone automatically detects the presence of the secure element when the removable card is inserted, and executes logic to make the secure element available to other applications on the mobile device.

In an embodiment, the application that selects the secure element from a plurality of secure elements available in the mobile phone or other portable electronic device determines selection based at least in part on prioritization among the available secure elements. For example, the application may first check to see if a removable card is present. If such a removable card having a secure element is present, the application may select a secure element in the removable card without considering other available secure elements. If, however, there is no removable card present or the present removable card does not have a secure element, the application may determine if a secure element associated with a preferred payment institution or payment mechanism is present, and if such a secure element is present, the application selects that secure element associated with the preferred payment institution or payment mechanism without considering other available secure elements. The prioritization among available secure elements may be defined in the original programming of the selection application. Alternatively, the prioritization may be configurable post-delivery, for example by a user selecting priorities in a dialog box presented by the mobile phone or other portable electronic device. Alternatively, in an embodiment, a user may have the option of manually selecting a secure element for use.

To maintain security standards, the other applications may access the secure element through the application in the trusted security zone rather than having direct access. At block 206, a near field communication transceiver in the mobile device is coupled to the selected secure element on the removable card, where switching logic in the application stored in the trusted security zone on the mobile device executes to perform the coupling. The application in the trusted security zone executes switching logic to couple the secure element on the removable card with the near field communication transceiver in the mobile device. Executing the coupling prior to initiating a near field communication connection allows secure access to data and credentials on the secure element when a connection is established.

At block 208, a wireless link is established between the near field communication transceiver in the mobile device and an external near field communication device, where the wireless link enables communication between the selected secure element on the removable card and the near field communication device. With the coupling of the near field communication transceiver and the selected secure element, communication between the secure element and the external near field communication device is enabled by establishing the wireless near field communication link. This communication allows for the secure near field communication transaction utilizing credentials and data contained in the secure element.

In an embodiment, the removable card is a memory card that comprises the secure element. It is common for mobile phones to contain a slot for a memory card to increase available storage beyond what is built in to the phone. Including the secure element as an embedded chip on the memory card extends the use of the standard memory card slot to provide the additional functionality of the secure element. In an embodiment, the removable card is a subscriber identity module (SIM) card that comprises the secure element. A subscriber identity module card is used for authentication to mobile networks using the Global System for Mobile Communications (GSM) standard. Adding the secure element functionality to the subscriber identity module card provides additional functionality while using the standard card interface.

In an embodiment, when the removable card is not inserted into the slot in the mobile device, a secure element embedded in the mobile device is selected. The switching logic in the application stored in the trusted security zone may contain selection rules to determine which secure element to select. These selection rules may include detecting if there is a secure element present in the removable card slot, and when no card is present to select an embedded secure element. In an embodiment, the secure element on the removable card contains credentials which may be used for payments, authentication, and other mobile financial services. The secure element on the removable card may support the same functionality as a secure element embedded in the mobile phone. The functionality may be dependent on the provider of the card and the planned use. For example, the removable card may be supplied by a financial institution, and the secure element may comprise credentials for an account and available balance. Alternatively, the secure element on the removable card may comprise credentials for a student identification from a community college the student is attending.

Figure 4:
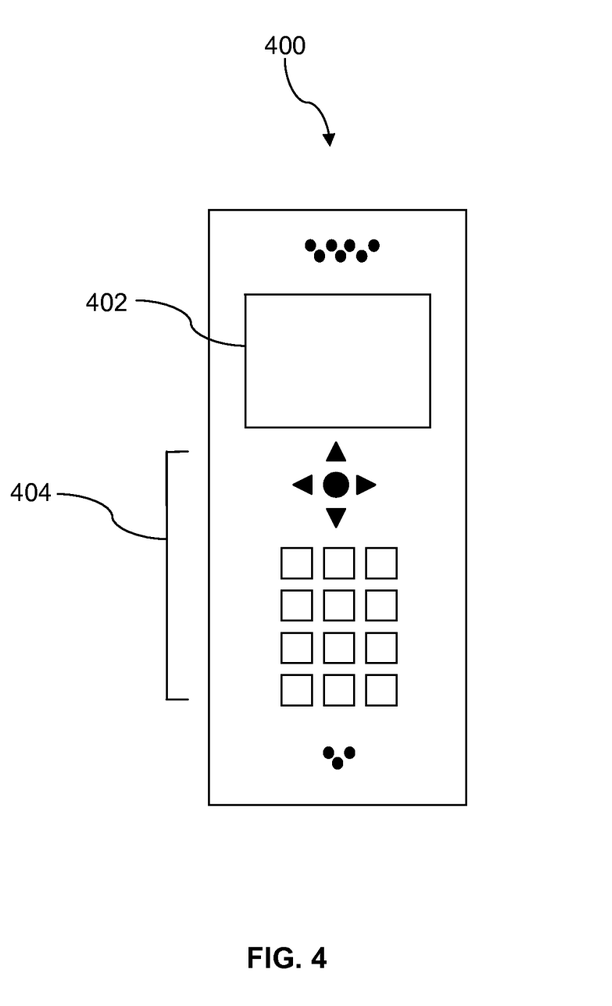
FIG. 4 is an illustration of a mobile device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
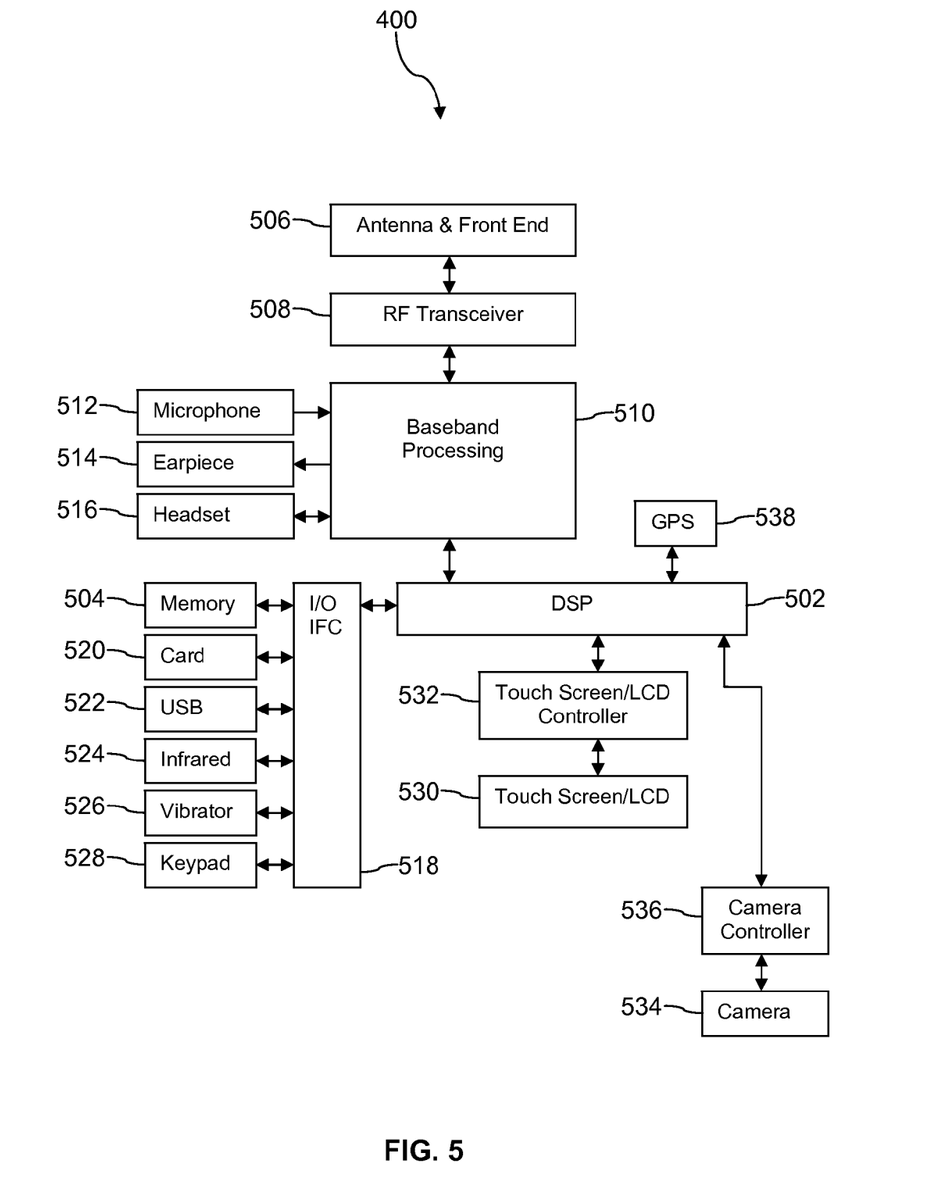
FIG. 5 is a block diagram of a mobile device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
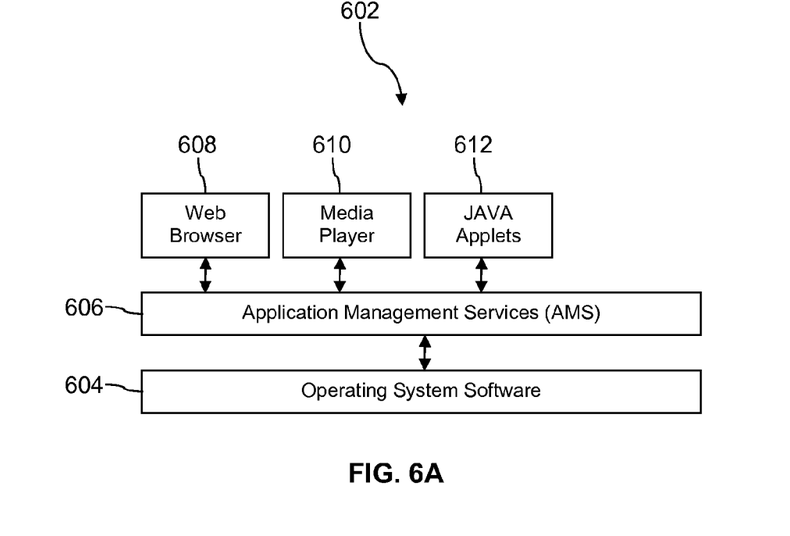
FIG. 6a is a block diagram of a software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
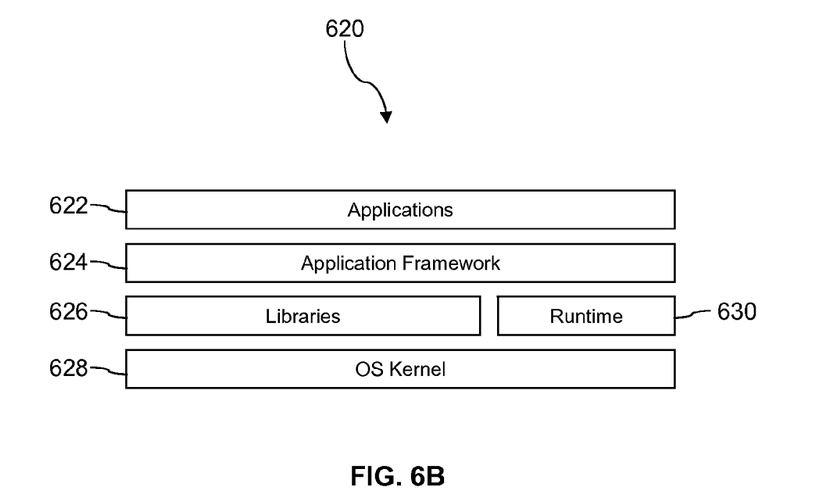
FIG. 6b is a block diagram of a software architecture for a mobile device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system on a mobile phone for selecting between a plurality of secure elements concurrently present on the mobile phone, wherein the selected secure element is used for wireless payment, comprising:
   a first virtual processor;
   an application stored in the first virtual processor;
   a second virtual processor comprising a secure partition;
   a trusted security zone located in the secure partition of the second virtual processor, wherein the trusted security zone runs a separate operating system that is not accessible to the mobile device users;
   a near field communication transceiver;
   the plurality of secure elements; and
   a switching application stored in the trusted security zone, wherein the switching application controls one or more hardware switches coupling the near field communication transceiver to one or more respective secure elements, wherein the switching application automatically selects which of the one or more respective secure elements to couple to the near field communication transceiver based on pre-defined selection rules comprising one of location and last account accessed, and wherein the selection is made prior to a wireless link being established between the near field communication transceiver and an external near field communication device.

2. The system of claim 1, wherein the first virtual processor and the second virtual processor execute in a time-sliced fashion.

3. The system of claim 1, wherein the trusted security zone utilizes security extensions implemented in Advanced Reduced Instruction Set Computer Machine (ARM) architecture.

4. The system of claim 1, wherein the plurality of secure elements comprises memory cards, subscriber identity module (SIM) cards, and embedded chips.

5. The system of claim 1, wherein the application stored in the first virtual processor is one of an electronic wallet application, a ticketing application, or a secure identification application.

6. The system of claim 5, wherein the near field communication transceiver is coupled to the selected secure element via the Single Wire Protocol (SWP).

7. A method of secure element selection for wireless payment and access control of a mobile device, comprising:
   controlling, by a switching application in a trusted security zone, one or more hardware switches coupling a near field communication transceiver to one or more respective secure elements of the plurality of secure elements, wherein the switching application automatically selects which of the one or more respective secure elements to couple to the near field communication transceiver based on pre-defined selection rules comprising one of location and last account accessed, and wherein the trusted security zone runs a separate operating system that is not accessible to the mobile device users; and
   establishing a wireless link between the near field communication transceiver in the mobile device and an external near field communication device, wherein the wireless link enables communication between the selected secure element and the external near field communication device, and wherein the wireless link is established after the switching application selects which of the one or more respective secure elements to couple to the near field communication transceiver.

8. The method of claim 7, wherein the selected secure element contains credentials used for payments, authentication, and other mobile financial services.

9. The method of claim 7, wherein the switching application is stored in the trusted security zone and is installed by the mobile device vendor or manufacturer.

10. The method of claim 7, wherein the near field communication transceiver is coupled to the selected secure element via the Single Wire Protocol (SWP).

11. The method of claim 7, wherein the predefined selection rules are transparent to the near field communication and secure element components.

12. The method of claim 7, wherein the predefined selection rules do not impede the near field communication security chain.

13. A method of secure element selection for wireless payment and access control, comprising:
   inserting a removable card comprising a secure element into a slot in a mobile device, wherein the secure element is comprised in a plurality of secure elements associated with the mobile device;
   automatically selecting the secure element on the removable card for use by an application requiring a secure element, wherein the selection is performed by a switching application stored in a trusted security zone on the mobile device, wherein the switching application automatically selects the secure element from the plurality of secure elements based on pre-defined selection rules comprising one of location and last account accessed, and wherein the trusted security zone runs a separate operating system that is not accessible to the mobile device users;
   controlling, by the switching application, one or more hardware switches coupling a near field communication transceiver to one or more respective secure elements of the plurality of secure elements;
   coupling the near field communication transceiver to the secure element on the removable card based on the automatic selection of the secure element on the removable card; and
   establishing a wireless link between the near field communication transceiver in the mobile device and an external near field communication device, wherein the wireless link enables communication between the selected secure element on the removable card and the external near field communication device, and wherein the wireless link is established after the switching application selects which of the one or more respective secure elements to couple to the near field communication transceiver.

14. The method of claim 13, wherein the removable card is a memory card that comprises the secure element.

15. The method of claim 13, wherein the removable card is a subscriber identity module (SIM) card that comprises the secure element.

16. The method of claim 13, wherein the secure element on the removable card contains credentials which may be used for payments, authentication, and other mobile financial services.

\* \* \* \* \*